United States Patent [19]

Jacob

[11] Patent Number: 4,726,218
[45] Date of Patent: Feb. 23, 1988

[54] TANK TIGHTNESS TEST APPARATUS PROBE

[75] Inventor: Allan S. Jacob, Rochester Hills, Mich.

[73] Assignee: Heath Consultants Incorporated, Stoughton, Mass.

[21] Appl. No.: 938,233

[22] Filed: Dec. 4, 1986

[51] Int. Cl.$^4$ ............................................. G01M 3/26
[52] U.S. Cl. ........................................ 73/49.2; 73/49.8
[58] Field of Search ............ 73/49.2, 49.8, 40, 40.5 R, 73/49.1; 138/90, 89; 374/4

[56] References Cited

U.S. PATENT DOCUMENTS

| | | |
|---|---|---|
| 3,331,238 | 7/1967 | Kost et al. .............................. 73/49.8 |
| 3,580,055 | 5/1971 | White ..................................... 73/49.2 |
| 3,631,895 | 1/1972 | Medina et al. ......................... 138/89 |
| 4,154,091 | 5/1979 | McLean ................................ 73/49.2 |
| 4,571,986 | 2/1986 | Fujii et al. ............................. 73/49.8 |

Primary Examiner—Stewart J. Levy
Assistant Examiner—Hezron E. Williams
Attorney, Agent, or Firm—Robert G. Mentag

[57] ABSTRACT

A thermal probe for use in a tightness testing apparatus for an underground storage tank provided with a fill pipe extending from ground level down to the tank, and including a mechanical compression, ring-shaped seal which sealingly engages the outer periphery of the access or fill pipe of an underground storage tank and expands to form a leak tight connection therewith.

4 Claims, 2 Drawing Figures

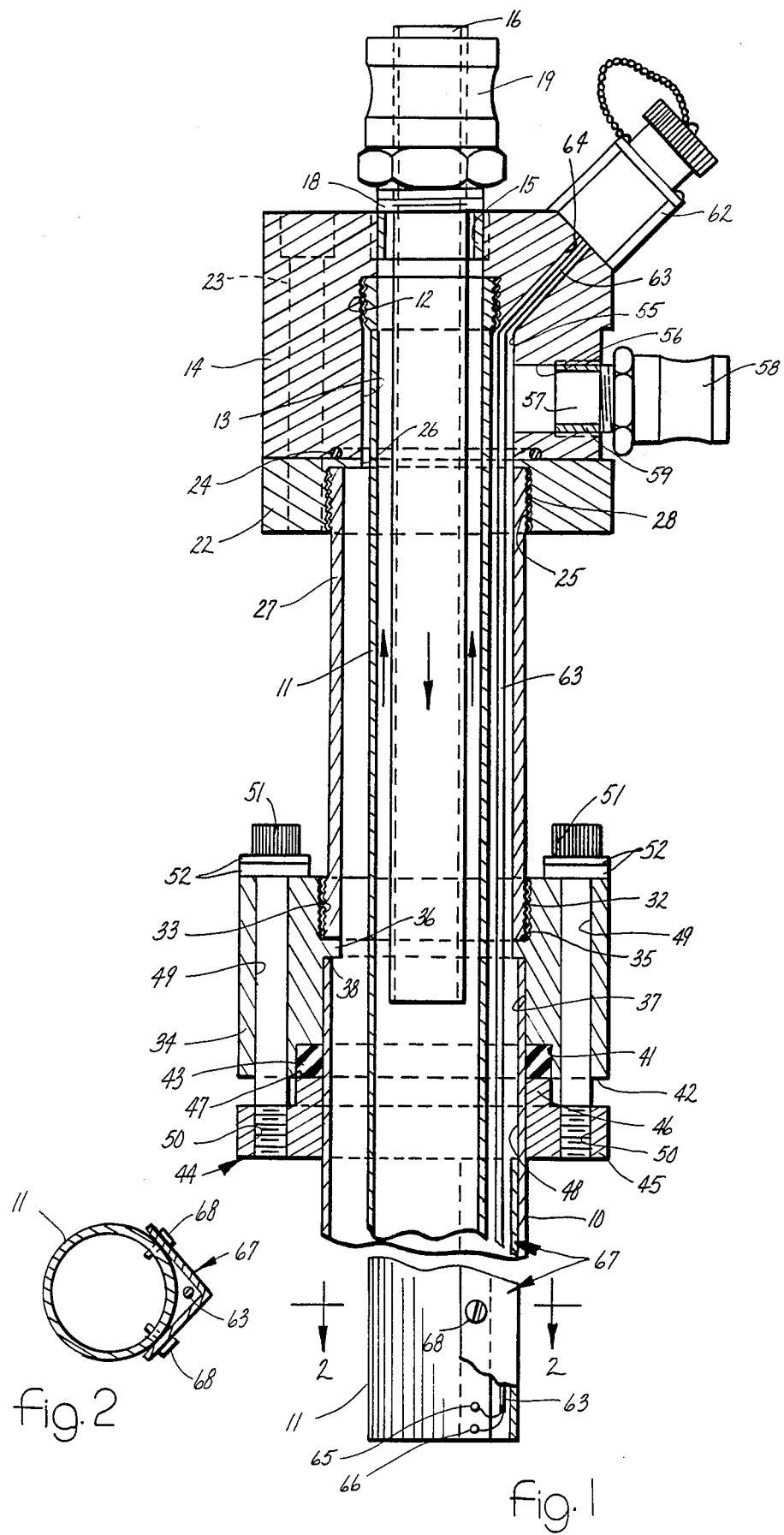

TANK TIGHTNESS TEST APPARATUS PROBE

BACKGROUND OF THE INVENTION

1. Technical Field

The field of art of which this invention pertains may be generally located in the class of devices relating to measuring and testing apparatuses. Class 73, measuring and testing, U.S. Patent Office classification appears to be the applicable general area of art to which the subject matter similar to this invention has been classified in the past.

2. Background Information

It is known in the measuring and testing art to provide test apparatus for measuring the tightness of tanks, such as underground fuel storage tanks. U.S. Pat. No. 3,580,055 to Richard B. White discloses a test apparatus for measuring the tightness of tanks, particularly underground fuel storage tanks. The test apparatus shown in the said patent has concentric suction and discharge tubes which extend down through a fill pipe into the underground tank and a pump at ground level is connected to the upper end of those tubes to provide a continuous recirculation of the fuel out of and back into the tank. A temperature sensor is provided on the lower end of the suction tube. At ground level the apparatus has a calibrated stand pipe for controlling the hydrostatic pressure of the fluid in the tank. An adaptor sleeve extends part way down into the tank external fill pipe, around the outside of the suction tube. A radially expandable annular seal of short vertical extent is mounted on the outside of the adaptor sleeve and is operated by a handle at ground level to provide a seal between the adaptor sleeve and the inside of the fill pipe. The seal arrangement shown in said patent was not entirely satisfactory in many installations, and it had to be supplemented with a similar seal of larger diameter and other fittings. An attempt to overcome the disadvantages of the seal arrangement in U.S. Pat. No. 3,580,055 was described in a later U.S. Pat. No. 4,154,091. The seal arrangement disclosed in the last mentioned patent includes a flexible and resilient annular diaphragm, of an appreciable vertical length, clamped to the outside of an adaptor sleeve, above and below openings in the later. An inner sleeve extends down, with slight clearance, inside the adaptor sleeve and at their upper ends (at ground level) the space between them is connected to an air inlet valve. When pressurized air is introduced through this valve it forces the elongated annular diaphragm radially outward into fluid-tight sealing engagement with the inside of the fill pipe for the underground tank.

The seal arrangement in the last mentioned U.S. Pat. No. 4,154,091 has been found to have many disadvantages and it has a history of failure after only minimal usage. The air seal disclosed in the last mentioned patent is very hard to replace in the field and it has been found that factory repair is costly and time consuming. The last described air seal arrangement is limited for use with three and four inch diameter tank fill pipes. The failure history of said air seal shows that the use of such a seal arrangement is not commensurate with controlling pollution of the environment. Failure of such an air seal during a tank testing operation often results in a loss of flammable or toxic material to the environment. The pollution control agencies of the Federal and State governments are sensitive to the pollution of the environment, regardless of the circumstances, and the failure of a tank testing air seal during a tank tightness test could result in an expensive clean-up procedure.

SUMMARY OF THE INVENTION

The present invention is directed to a thermal probe for use in a tightness testing apparatus for testing an underground storage fuel tank provided with a fill tube extending from ground level down to the tank. The thermal probe includes a support means which carries a novel mechanical compression seal arranged and constructed to be seated around, and to expand and form a leak tight connection with, the access tube or fill pipe for an underground storage fuel tank. The compression seal is ring-shaped and it is carried by a clamp head which forms a part of the supporting means for the probe. A clamp ring is carried by the clamp head for creating a compression force on the compression seal to expand it into a leak tight connection with the access tube or fill pipe of a storage tank. The compression seal may be made of rubber or any other suitable sealing material such as an elastomeric material, neoprene coated with "TEFLON" material on all surfaces except the exterior peripheral surface, or other like material. The mechanical compression seal of the present invention and its supporting structure is not limited to any particular size access tube or fill pipe, but may be made to any desired size pipe from 2 inches diameter and larger.

BRIEF DESCRIPTION OF THE DRAWINGS

FIG. 1 is a broken, longitudinal section view of a tank tightness test apparatus probe, made in accordance with the principles of the present invention.

FIG. 2 is a cross section view of the tank tightness test apparatus probe illustrated in FIG. 1, taken along the line 2—2 thereof, and looking in the direction of the arrows.

DESCRIPTION OF THE PREFERRED EMBODIMENT

Referring to FIG. 1, the reference numeral 10 designates the usual external fill pipe which extends from ground level down into the top of an underground fuel storage tank (not shown). The test apparatus probe of the present invention has a vertical, elongated inlet or suction tube 11 which extends down through the external fill pipe 10 into an underground fuel storage tank for the same purpose as described in U.S. Pat. No. 3,580,055. The inlet or suction tube 11 is concentric with the external fill pipe 10, and it is smaller in diameter so that it is spaced concentrically from the inside of the external fill pipe 10.

As shown in FIG. 1, the upper end of the suction tube 11 is externally threaded at the point indicated by the numeral 12. The upper end of the suction tube 11 extends upwardly in a bore 13 formed in the lower end of an annular support body member 14. The upper threaded end 12 of the suction tube 11 is threadably received in the inner end of a threaded bore 15 which is formed in the upper end of the annular support body member 14, and which is aligned with the bore 13 in the lower end of the support body member 14. The upper end of the threaded bore 15 threadably receives the threaded lower end 18 of a quick-disconnect hydraulic fluid coupling adaptor 19 of a conventional design. A recirculating pump at ground level has its inlet connected through a hose to a complementary quick-disconnect coupling member (not shown) which is manually attachable to the upper end of the adaptor member 19 in the usual manner. The outlet of the recirculating pump is connected to the upper end of a discharge tube 16 for continuously recirculating the fuel in the tank in the same manner and for the same purpose as described in the aforementioned U.S. Pat. No. 3,580,055. The discharge tube 16 extends concentrically down through the inlet or suction tube 11 to a location close to the bottom of the underground tank.

A support retainer plate 22 is releasably secured to the bottom end of the support body member 14 by a plurality of suitable socket head cap screws 23. A suitable O-ring 24 of a rubber-like or elastomeric material is seated in an annular groove in the bottom of the support body member 14, and it is deformed against the top of the retainer plate 22 to provide a fluid tight seal between the support body member 14 and the retainer plate 22, when the screws 23 are tightened. The O-ring 24 extends around a cylindrical threaded bore 25 in the lower side of the retainer plate 22. The inner end of the threaded bore 25 communicates with an aligned, reduced diameter bore 26 which is formed through the upper end of the retainer plate 22, and which communicates with the lower end of the bore 13 in the support body member 14.

An elongated support carrier member 27, in the form of a tube or pipe, has an upper threaded end 28 threadably mounted in the threaded bore 25 in the retainer plate 22. The carrier member pipe 27 has a lower threaded end 32 threadably mounted in a threaded bore 33 which is formed in the upper end of an annular support clamp head 34. The lower end of the carrier member pipe 27 seats against a shoulder 35 formed at the inner end of the threaded bore 33. The threaded bore 33 in the upper end of the clamp head 34 communicates through a reduced diameter bore 36 with an enlarged diameter bore 37 which extends axially inwardly from the lower end of the annular clamp head 34. As shown in FIG. 1, the inlet or suction pipe 11 extends downwardly through the carrier member pipe 27 and through the annular clamp head 34. The shoulder 38 is formed at the junction of the bore 37 and the bore 36.

As shown in FIG. 1, an annular groove 41 is formed in the lower end 42 of the clamp head 34 and it extends axially upward in a concentric position about the bore 37. A ring shaped compression gasket or seal 43 is seated in the groove 41, and the external fill pipe 10 is adapted to be received in the bore 37 and have the interior periphery of the seal 43 sealingly engage the smooth outer periphery thereof, during a test operation. The upper end of the external fill pipe 10 is adapted to be seated against the shoulder 38 in the clamp head 34. The seal or gasket 43 may be made from any suitable sealing material, as for example, an elastomeric material, or neoprene coated with "TEFLON" on all surfaces except the exterior peripheral surface.

The compression seal 43 is adapted to be compressed into a sealing engagement with the outer smooth surface of the exterior fill pipe 10 by means of an adjustably mounted compression clamp ring, generally indicated by the numeral 44. The compression clamp ring 44 is T-shaped in cross section and includes a larger diameter annular ring portion 45 which has formed on the upper side thereof an integral annular reduced diameter compression ring portion 46. As shown in FIG. 1, the compression clamp ring portion 46 has an upper end 47 which engages the lower side of the compression seal 43. The diameter of the compression ring upper portion 46 is made of a size slightly smaller in diameter then the groove 41 so that it may be moved upwardly into the groove 41 to compress the seal 43 against the smooth side of the exterior fill pipe 10 to seal against any fluid escaping past the seal 43 to the atmosphere during a test operation.

The compression clamp ring 44 has an axial bore 48 formed therethrough, through which is mounted the external fill pipe 10 and the inlet or suction pipe 11.

The clamp head 34 is provided with a plurality of longitudinally disposed bores 49, at selected positions spaced about the periphery of the clamp head 34. The bores 49 are aligned with threaded bores 50 in the enlarged diameter portion 45 of the compression clamp ring 44. An Allen head bolt 51 is slidably mounted through each bore 49 and its lower threaded end is threadably engaged in the adjacent threaded bore 50 in the compression clamp ring portion 45. A pair of suitable washers 52 are operatively mounted between the head of each bolt 51 and the upper end of the clamp head 34. It will be seen, that when the bolts 51 are threaded into the threaded bores 50 in the compression clamp ring 44 that the clamp ring 44 is moved upwardly into a compressing action on the seal 43 to force it into sealing engagement against the outer smooth surface of the external fill pipe 10.

As shown in FIG. 1, the bore 13 in the annular body member 14 is enlarged on the right side thereof, with a counter bore 55 that extends upwardly from the lower end thereof, and which communicates with a transverse bore 56. The inner threaded end 57 of a quick-disconnect conventional male hydraulic adaptor or fitting 58 is threadably mounted in the outer threaded end 59 of the bore 56. A standpipe, as shown in U.S. Pat. No. 3,580,055, may be connected to the quick-disconnect adaptor member 58 through a mating quick-disconnect coupling member, with or without a hose or pipe, all for the same purpose as explained in U.S. Pat. No. 3,580,055. It will be seen that the counter bore 55 communicates with the interior of the carrier pipe 27, which in turn communicates with the interior of the external fill pipe 10, so that fluid from the tank can be allowed to move upwardly through the last mentioned parts and out the adaptor fitting 58 and into a standpipe under static pressure on the fuel tank.

An electrical connector or fitting 62 of a conventional design, as an amphenol military connector, is mounted on the top of the body member 14, at one side of the quick-disconnect hydrualic coupling 16. Insulated electrical conductors 63 extend down from the connector 62 through a diagonal bore 64 formed in the annular support body 14. The bore 64 communicates with the counter bore 55. Accordingly, it is seen that the electrical conductors 63 extend down through the bore 55 and through the carrier pipe 27, and through the external fill pipe 10, and downwardly into the underground storage fuel tank (not shown). At the lower end of the suction tube 11, the insulated electrical conductor 63 are connected to the terminals 65 and 66 of a temperature sensor, preferably, a thermistor, on the inside of the suction tube 11 which is exposed to the fuel flowing from the underground tank up into the suction tube 11. An accurate temperature measuring device (not shown) is connected to the electrical fitting 62 to provide, at a convenient location above ground, a visual reading of the fuel temperature as sensed by the thermistor inside the lower end of the suction tube 11. As shown in FIGS.

1 and 2, an integral, two-sided, elongated shield, generally indicated by the numeral 67, is mounted along the suction tube 11 on the outer periphery thereof, and it encloses the insulated electrical conductors 63 to protect them. The shield 67 is secured to the suction tube 11 by a plurality of suitable screws 68. The body member 14, retainer plate 22, carrier pipe 27, clamp head 34 and clamp ring 44 function as a support means for the suction tube 11.

In use, after exposing the threaded end of the usual external fill pipe 10 of an underground storage fuel tank and cleaning the outer surface of the fill pipe 10, the tank tightness test apparatus probe is mounted over the fill pipe 10 so as to slide the clamp head 34 down over the fill pipe 10 until the upper end of the fill pipe seats against the shoulder 38 in the clamp head 34. The annular seal 43 at that point is disposed around the smooth surface of the external fill pipe 10, and the bolts 51 are then tightened in an alternate manner, so as to provide a uniform compression on the seal 43 and in turn a uniform sealing engagement with the outer smooth surface of the external fill pipe 10. The tank tightness test apparatus probe of the present invention is not limited to any particular pipe size. The various tubes and pipes thereof may be made to any size compatible with a tank fill pipe, from a 2 inch diameter fill pipe and larger. It will be seen that replacement of the seal 43 is a simple and inexpensive operation. An advantage of the improved sealing means of the present invention, over the air sealing structure of U.S. Pat. No. 4,154,091, is that a testing apparatus as shown in U.S. Pat. No. 3,580,055 and provided with a probe of the present invention does not need, and has no use for, an air pump at the underground tank site to inflate an air seal, such as the air seal employed in the structure shown in U.S. Pat. No. 4,154,091. The sealing structure of the present invention uses a dry compression seal that clamps over the access or external fill pipe of an underground storage tank. Underground storage tanks of the type with which the present invention may be employed usually contain petroleum products, but they may also contain industrial solvents and chemicals. Suitable materials for the seal 43 may be selected in accordance with the fluid in a tank which is to be tested, such as industrial solvents and chemicals.

An advantage of the mechanical seal apparatus of the present invention over the air seal structure of U.S. Pat. No. 4,154,091, is that the apparatus of the present invention may be installed in 50% less time then it takes to install the air seal apparatus of the last mentioned patent. The mechanical seal apparatus of the present invention also overcomes failures which have heretofore been atributed to the prior air seal disclosed in the last mentioned patent.

What is claimed is:

1. A thermal probe for use in a tightness testing apparatus for an underground storage tank provided with a fill pipe extending from ground level down to the tank, comprising:
    (a) a support member having an upper end and a lower end;
    (b) a suction tube, which is insertable loosely down through the fill pipe into the tank, and which has an upper end attached to the support member;
    (c) a discharge tube extending down through the support member from the upper end thereof and through the suction tube into the tank;
    (d) the suction tube extends through a clamp support member which is telescopically seated on the fill pipe and which carries a clamp means for sealingly securing the probe to a tank fill pipe;
    (e) the clamp member being spaced from the support member and detachably connected thereto by a carrier member; and,
    (f) said clamp means including a compression seal means for sealing engagement with the outer periphery of the fill pipe of the tank.

2. A thermal probe for use in a tightness testing apparatus for an underground storage tank as defined in claim 1, wherein:
    (a) said compression seal means comprises a ring-shaped seal member.

3. A thermal probe for use in a tightness testing apparatus for an underground storage tank as defined in claim 2, wherein:
    (a) said clamp means includes an adjustable compression clamp ring carried by said clamp support member for exerting a compression force on the seal member longitudinally of the fill pipe to expand the seal member radially inward into sealing engagement with the outer periphery of the fill pipe.

4. A thermal probe for use in a tightness testing apparatus for an underground storage tank as defined in claim 3, wherein:
    (a) said probe includes an electrical connector on the support means for a thermal sensor, and electric conductors connected to said connector and extended through the support means and over the exterior length of the suction tube; and,
    (b) an elongated shield means is mounted on the suction tube and encloses the electric conductors.

* * * * *